(12) United States Patent
Angwin

(10) Patent No.: US 10,275,521 B2
(45) Date of Patent: Apr. 30, 2019

(54) SYSTEM AND METHOD FOR DISPLAYING CHANGES IN TRENDING TOPICS TO A USER

(71) Applicant: John Angwin, Milpitas, CA (US)

(72) Inventor: John Angwin, Milpitas, CA (US)

(*) Notice: Subject to any disclaimer, the term of this patent is extended or adjusted under 35 U.S.C. 154(b) by 1321 days.

(21) Appl. No.: 13/651,414

(22) Filed: Oct. 13, 2012

(65) Prior Publication Data

US 2014/0108393 A1 Apr. 17, 2014

(51) Int. Cl.
*G06F 17/30* (2006.01)
*G06Q 50/00* (2012.01)

(52) U.S. Cl.
CPC .. *G06F 17/30705* (2013.01); *G06F 17/30864* (2013.01); *G06Q 50/01* (2013.01)

(58) Field of Classification Search
CPC ............... G06F 17/30; G06F 17/3064; G06F 17/30864; G06F 17/30964; G06F 17/30705; G06F 17/30899; G06Q 50/01
USPC ...................... 707/731, 737, 749
See application file for complete search history.

(56) References Cited

U.S. PATENT DOCUMENTS

| | | | | |
|---|---|---|---|---|
| 8,462,160 | B2* | 6/2013 | Lindsay | G06Q 10/10 345/440 |
| 9,002,858 | B1* | 4/2015 | Dassa | G06Q 30/0202 705/319 |
| 2005/0198056 | A1* | 9/2005 | Dumais | G06F 17/30867 |
| 2007/0022072 | A1* | 1/2007 | Kao | G06F 17/2211 706/45 |
| 2007/0094247 | A1 | 4/2007 | Chowdhury | |
| 2007/0100875 | A1 | 5/2007 | Chi | |
| 2008/0288488 | A1 | 11/2008 | Muecke | |
| 2009/0055359 | A1 | 2/2009 | Gross | |
| 2010/0088322 | A1 | 4/2010 | Chowdhury | |
| 2010/0100537 | A1 | 4/2010 | Druzgalski | |
| 2010/0275128 | A1* | 10/2010 | Ward et al. | 715/744 |
| 2011/0184951 | A1* | 7/2011 | Paparizos et al. | 707/737 |
| 2011/0218946 | A1 | 9/2011 | Stern | |
| 2011/0258148 | A1* | 10/2011 | Gao et al. | 706/12 |
| 2011/0282874 | A1 | 11/2011 | Xu | |
| 2011/0320715 | A1 | 12/2011 | Ickman | |

(Continued)

OTHER PUBLICATIONS

James Benhardus, "Streaming Trend Detection in Twitter", In 2010 UCSS REU for Artificial Intelligence, Natural Language Processing and Information Retrieval Final Report, 2010, Colorado Springs, CO USA.

(Continued)

*Primary Examiner* — Shahid A Alam
*Assistant Examiner* — Andalib F Lodhi

(57) ABSTRACT

A system and method for displaying changes in trending topics to a user in a network environment is described. The method includes retrieving a first group of content items, generating a first group of topics for the first group of content items, and displaying a first display to the user. The method further includes retrieving a second group of content items, generating a second group of topics for the second group of content items and zero or more first content items from the first group of content items, determining a similarity or dissimilarity between a second topic from the second group of topics and a first topic from the first group of topics, and displaying a second display which includes the result of determining a similarity or dissimilarity.

15 Claims, 5 Drawing Sheets

(56) References Cited

U.S. PATENT DOCUMENTS

| | | | |
|---|---|---|---|
| 2012/0005224 A1* | 1/2012 | Ahrens et al. | 707/769 |
| 2012/0166438 A1* | 6/2012 | Wu et al. | 707/737 |
| 2013/0110823 A1* | 5/2013 | Su et al. | 707/723 |
| 2013/0219298 A9* | 8/2013 | Whalin et al. | 715/753 |
| 2013/0275527 A1* | 10/2013 | Deurloo | H04L 51/32 709/206 |

OTHER PUBLICATIONS

Sitaram Asur, Bernado Huberman, Gabor Szabo, Chunyan Wang, "Trends in Social Media: Persistence and Decay", In 5th International AAAI Conference on Weblogs and Social Media, 2011.

* cited by examiner

SYSTEM AND METHOD FOR DISPLAYING CHANGES IN TRENDING TOPICS TO A USER

BACKGROUND OF THE INVENTION

Within the field of computing, trending topic systems collect content items from content sources then generate, rank, sort, and display topics to users. These systems distill vast amounts of information and provide users with a summary of popular subjects or themes expressed in recently-posted content items. Several types of trending topic systems exist, some of which operate on social networks as the content sources. Twitter, for example, uses itself as the content source and Tweets generated by its users as the content items. It identifies trending phrases contained with these Tweets and lists the top-ranking to users. News aggregators are another type of trending topic system that operate on news websites as content sources and news articles as content items. Google News is one such example. It constantly monitors news websites for news articles and identifies commonalities between the news articles to generate, rank, and sort topics. As anyone skilled in the art will acknowledge, trending topic systems discussed herein generally operate on content items rich in words and phrases and authored by humans. Systems that operate on data largely numerical in nature, such as stock trading systems, fall outside of the scope of this art.

While useful, conventional trending topic systems only show users a static view of information and don't provide users with valuable information about how topics have changed since the user last checked a trending topic display. At any given point in time, a frequent user who checks the display every few minutes sees the same information as an infrequent user who checks the display once per day. The frequent user will likely see most of the same topics as the previous display and must consciously separate the new from the old. The infrequent user will likely see mostly new topics. However, the infrequent user likely missed other, possibly interesting topics that had trended at an earlier time and are no longer part of the current display. For both the frequent and infrequent users, conventional trending topic systems lack the capabilities to provide an ideal experience.

A system and method for displaying changes in trending topics to users requires unique topic comparison capabilities. When a user requests a display, a comparison is required between current topics and prior topics to determine which topics are new and which topics are old. Conventional trending topic systems are able to compare content item characteristics for the purpose of generating topics but fall short with regard to topic-to-topic comparison. Content items have a static structure. For the most part, content item characteristics don't change over time. Topics, on the other hand, are dynamic. The content items and characteristics associated with a topic change as the body of information across the network changes. Lacking the ability to adequately compare topics, conventional trending topic systems do not have the capacity to display changes in trending topics to users.

SUMMARY OF THE INVENTION

A system and method for displaying changes in trending topics over time to a user in a network environment is described. In one embodiment, the method includes retrieving a first group of content items, generating a first group of topics for the first group of content items, and displaying a first display to a user. After displaying the first display, the method further includes retrieving a second group of content items in the network environment and generating a second group of topics for the second group of content items and zero or more first content items from the first group of content items. The method further includes determining a similarity or dissimilarity between a second topic from the second group of topics and a first topic from the first group of topics then displaying to the user a second display. The second display includes one or more of the differences between the second group of topics and the first group of topics based on the results of the determining a similarity or dissimilarity.

In another embodiment, the method includes computing a topic similarity score for determining a similarity or dissimilarity between a second topic from the second group of topics and a first topic from the first group of topics. If the topic similarity score exceeds a predefined threshold, the second topic and the first topic are considered similar. Otherwise, the second topic and the first topic are considered dissimilar. The topic similarity score is based on characteristics of content items associated with the second topic and characteristics of content items associated with the first topic. Characteristics of content items include but are not limited to terms contained in the content items, retrieval times of the content items, and publication times of the content items.

In another embodiment, the second group of topics is a trending group of topics and the second display is a new topic display. The trending group of topics includes the top-ranking topics according to a predefined measure. The new topic display includes each trending topic from the trending group of topics along with a visual indicator for each trending topic dissimilar to each first topic from the first group of topics. In another embodiment, the new topic display includes a visual indicator next to each trending topic similar to at least one first topic from the first group of topics. In yet another embodiment, the new topic display includes each trending topic from the trending group of topics dissimilar to each first topic from the first group of topics.

In another embodiment, the second group of topics is a no longer trending group of topics and the second display is a missed display. The no longer trending group of topics includes topics generated since the first display that were trending at a point in time but are no longer trending. The missed display includes each no longer trending topic from the no longer trending group of topics that is dissimilar to each first topic from the first group of topics.

DETAILED DESCRIPTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and systems similar or equivalent to those described herein can also be used in the practice or testing of the present invention, a limited number of the exemplary methods and systems are described herein.

Figure 1:
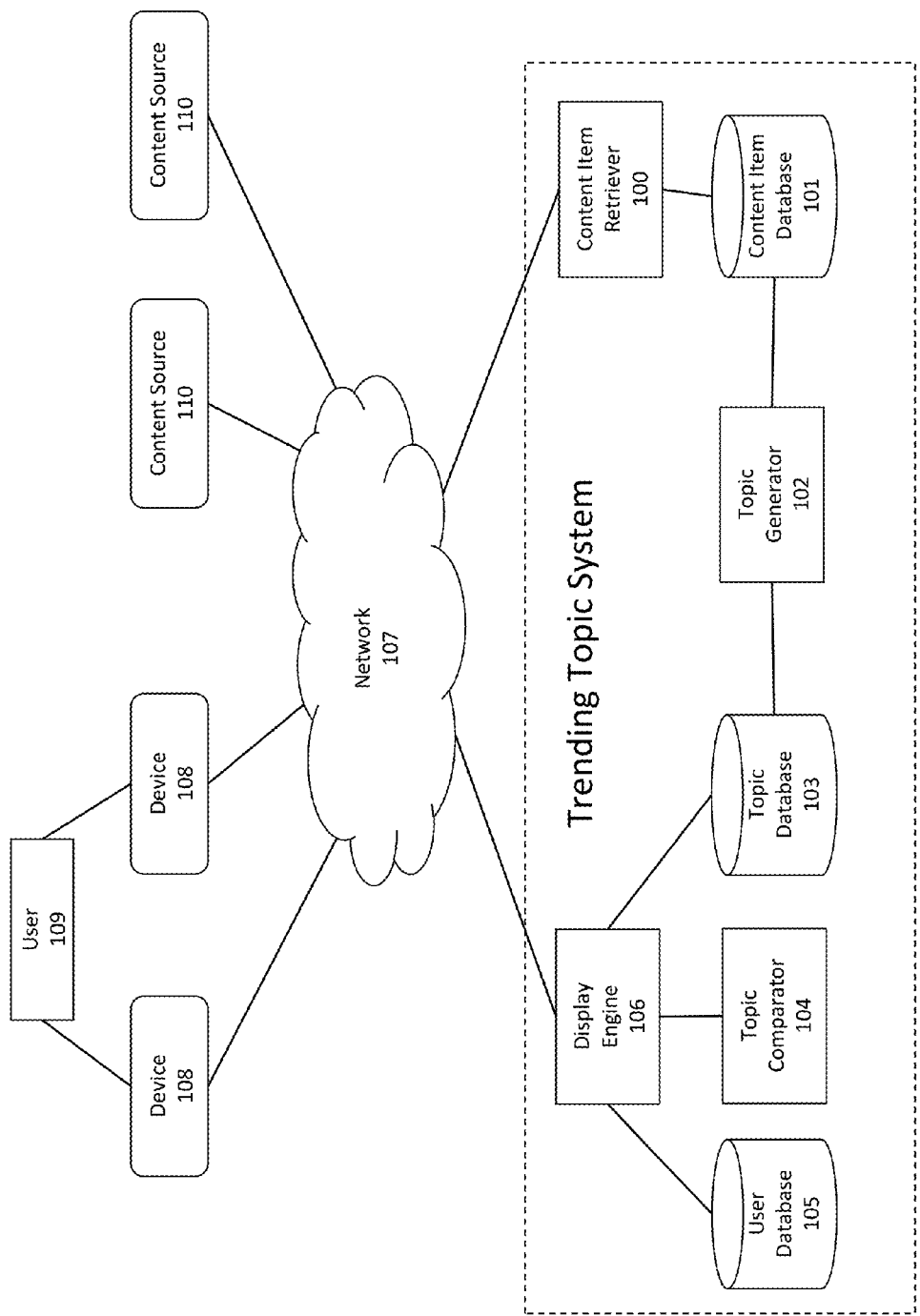
FIG. 1 illustrates an exemplary environment for generating topics, determining a similarity or dissimilarity between topics, and displaying changes to users.

A system and method for displaying changes in trending topics to a user in a network environment is described. FIG. 1 illustrates an exemplary environment for generating topics, determining a similarity or dissimilarity between topics, and displaying changes to users in a network environment. Examples of networks include but are not limited to the Internet, a local computer network, an intranet, an extranet, or a network of networks.

A content source provides content items over the network. A content source is sometimes the author of the content items it provides or simply a distributor. Examples of content sources include but are not limited to news websites, blogs, microblogs, and social networks. Content sources make content items available over the network using technologies including but not limited to web servers, application servers, and electronic mail servers.

Content sources support network protocols including but not limited to HTTP, HTTPs, FTP, and SMTP. Content sources provide content items in formats including but not limited to HTML, XML, JSON, and RSS. Examples of content items include but are not limited to news articles, blog entries, web pages, status updates on social networks such as Twitter and Facebook, and RSS feeds. A content item retriever 100 collects content items from content sources 110 over a network 107 and stores them in a content item database 101. The content item database 101 may reside completely in a computer's memory, in a persistent store, or both.

A topic generator 102 reads content items from the content item database 101 then generates, ranks, and sorts topics. A topic is a subject or theme described by one or more content items. Thus, a topic has one or more content items associated with it. A content item can be associated with multiple topics. Content items associated with the same topic relate to the same subject or theme.

The topic generator 102 computes a topic ranking score that is used to rank topics. The topic ranking score for a topic is based on factors including but not limited to the number of content items associated with the topic, retrieval times of content items associated with the topic, and publication times of content items associated with the topic. A retrieval time for a content item refers to when the trending topic system retrieved the content item from the content item's content source 110 across the network 107. A publication time for a content item refers to when the content item's content source 110 made the content item available across the network 107. A trending group of topics is a list of the top-ranking topics. The size of the trending group of topics may be fixed or may vary based on time of day. The size may also vary based on the topic ranking scores of the topics in the trending group of topics. The topic generator 102 runs continuously, meaning topics are generated when content items are added to the content item database 101. The topic generator 102 may also run at regular time intervals such as every minute or every hour. A topic database 103 stores results from the topic generator 102 either in memory, in a persistent store, or both.

A topic comparator 104 determines a similarity or dissimilarity between topics. The determination is made by computing a topic similarity score between a second topic and a first topic. If the topic similarity score surpasses a predefined threshold, the second topic and the first topic are similar. Otherwise, the second topic and the first topic are dissimilar. The topic similarity score is based on characteristics in common between content items associated with the first topic and content items associated with the second topic. Characteristics of a content item include but are not limited to terms contained in the content item (including but not limited to a body content, a title, and a summary), terms contained in other content items that refer to the content item (including but not limited to Tweets, news articles, blogs, microblogs, status updates on social networks, and RSS feeds), retrieval time of the content item, and publication time of the content item.

The topic comparator 104 further operates on groups of topics. As an example, consider a second group of topics and a first group of topics as input. The topic comparator 104 can determine all topics in the second group of topics similar to at least one topic in the first group of topics. The topic comparator 104 can further determine all topics in the second group of topics dissimilar to each topic from the first group of topics.

A display engine 106 formats and prints topics from the topic database 103 and results from the topic comparator 104 to users. A user interacts with the display engine 106 through a device 108. Types of devices include but are not limited to desktop computers, laptops, smartphones, and tablets. Devices run software applications including web browsers and smartphone applications that render information received over the network 107 from the display engine 106. When the display engine 106 renders a topic, it prints characteristics of one or more the content items associated with the topic. These characteristics include but are not limited to terms, body contents, titles, summaries, retrieval times, and publication times.

Figure 2:
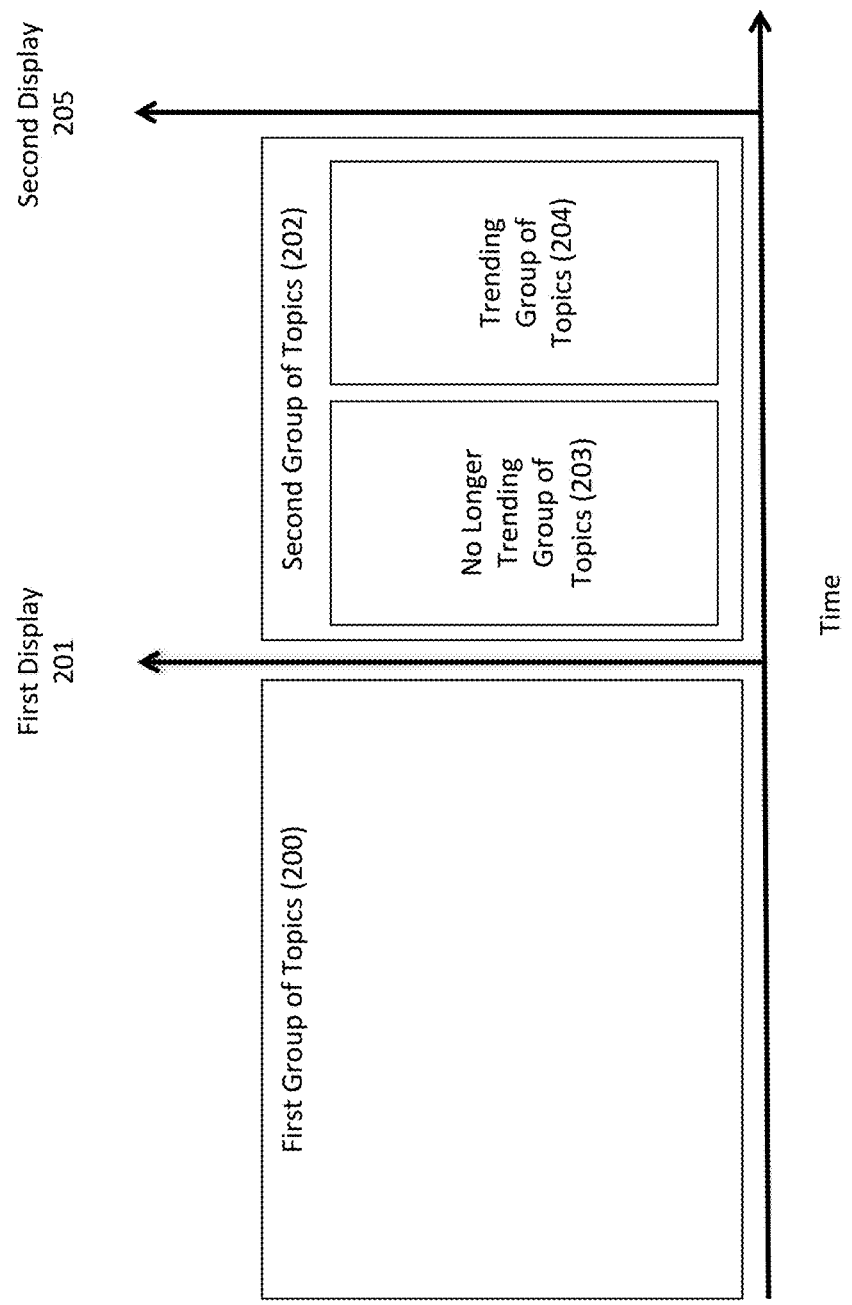
FIG. 2 illustrates the relationship between displays and the groups of topics being compared in the exemplary environment.

A user database 105 maintains user records. For each user, the user database 105 maintains a user record that includes a marker of when the display engine 106 last rendered a display to the user. We refer to this display as a first display. In some embodiments the marker is a timestamp. Using the marker of the user, the display engine 106 queries the topic database 103 for two groups of topics: a first group of topics and a second group of topics. The first group of topics includes one or more topics generated before the first display was rendered to the user. The second group of topics includes of one or more topics generated after the first display was rendered to the user and before a second display is rendered to the user. FIG. 2 shows the relationship between the first display, the first group of topics, the second display, and the second group of topics.

FIG. 2 further illustrates two subgroups that exist within the second group of topics: a trending group of topics 204 and a no longer trending group of topics 203. The trending group of topics 204 includes those topics still among the top-ranking just before the second display 205 is rendered. In conventional trending topic systems, any time a user requests a display they are presented with the trending group of topics for that time. The no longer trending group of topics 203 includes those topics generated after the first display 201 that were among the trending topics at an earlier point in time, but are no longer among the trending topics just before the second display 205 is rendered. If a lot of time elapses between the first display 201 and second display 205, the number of topics in the no longer trending group of topics 204 can be large. In most trending topic systems, the size of the trending group of topics 204 is small and is often set to a constant value. As an example, a trending topic system may display the 10 top-ranking topics at any given time.

Figure 3:
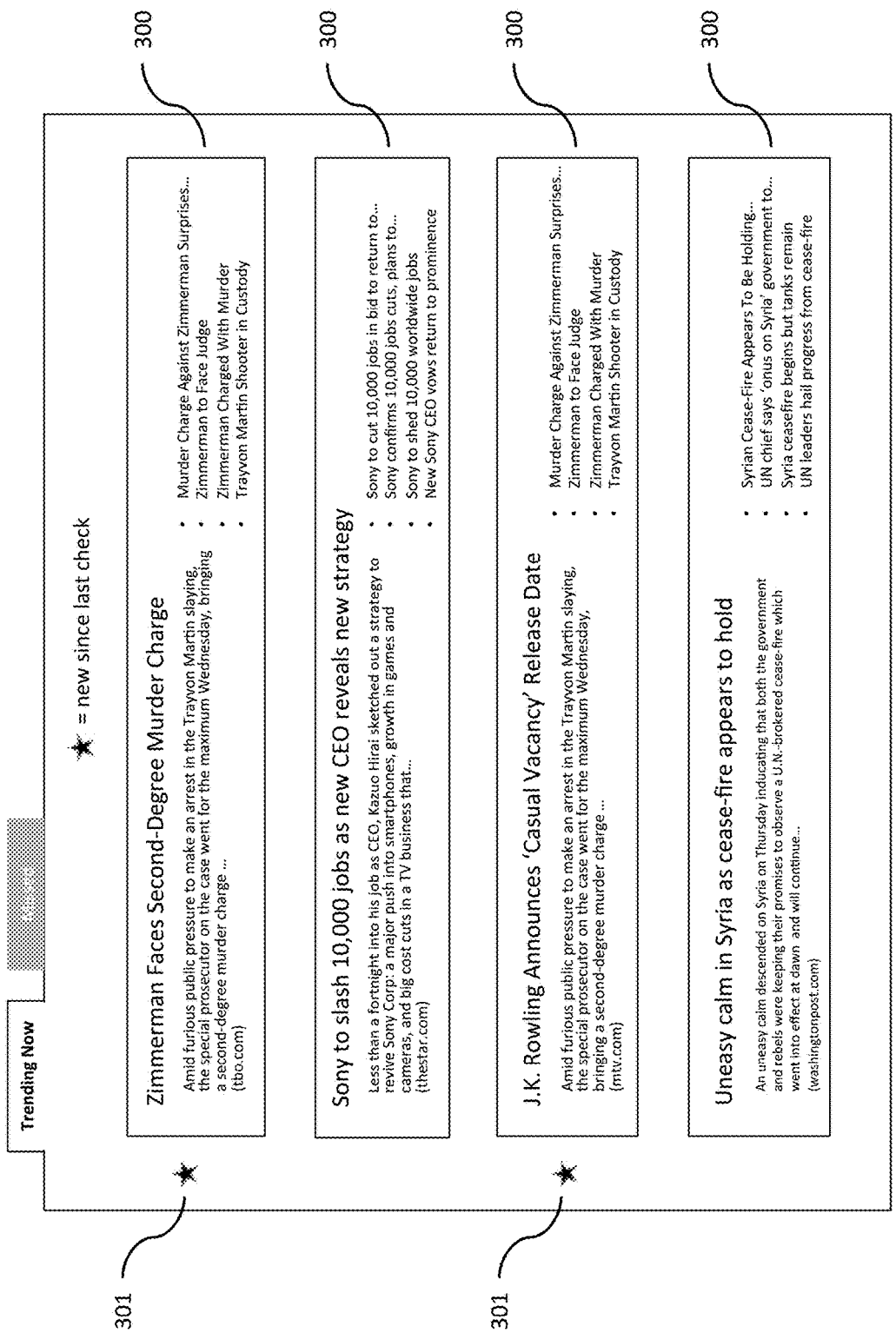
FIG. 3 illustrates an example of a second display called a new topic display. A star indicates each trending topic from a trending group of topics dissimilar to each first topic from a first group of topics. The first group of topics was generated prior to a first display.

Utilizing the topic comparator 104 along with a second group of topics and a first group of topics for a user, the display engine 106 can show changes in trending topics to the user in a second display. FIG. 3 shows an example of a second display called a new topic display. Using a conventional trending topic system, the user has no insight into which trending topics are new and which are old since the user's last display. The user must recall what had been displayed earlier and consciously perform a comparison. The new display provides such insight. To render the new topic display, the display engine 106 requests a trending group of topics and a first group of topics for the user from the topic database 103. The display engine 106 then requests from the topic comparator 104 each trending topic from the trending group of topics dissimilar to each first topic from the first group of topics. The result represents the trending topics new to the user since the first display was rendered and can be indicated by the display engine 106 in a number of ways. The new topic display in FIG. 3 shows each trending topic from the trending group of topics along with a visual indicator (star 301) next to each trending topic deemed new by the topic comparator 104. The display engine 106 can visually indicate new topics in other ways including but not limited to the following. It can use a different background color behind new topics. It can print another type of icon next to new topics. It can dim out those topics not new such that the new topics visually stand out to the user. Or it may just print the new topics without printing the other topics from the trending group of topics.

Figure 4:
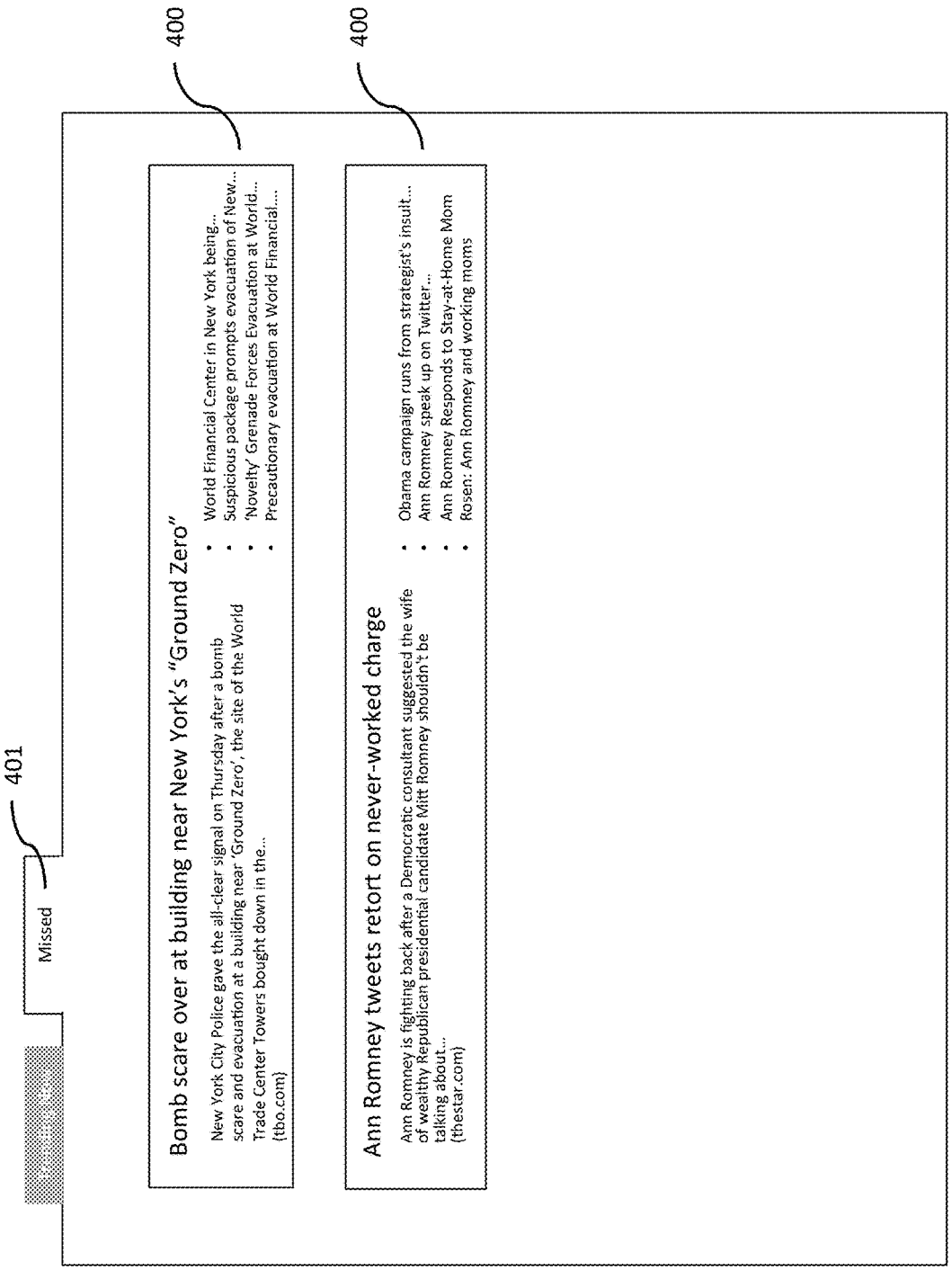
FIG. 4 illustrates another example of a second display called a missed display. It includes each no longer trending topic from a no longer trending group of topics dissimilar to each first topic from a first group of topics. The first group of topics was generated prior to a first display.

FIG. 4 illustrates another type of second display called a missed topic display. Using a conventional trending topic system, a user has no insight into topics that had trended since the user's last display and are no longer trending. The user may have missed important topics. The missed topic display provides such insight. In the missed topic display, the display engine 106 requests from the topic database 103 a no longer trending group of topics and a first group of topics for the user. The display engine 106 then requests from the topic comparator 104 each no longer trending topic from the no longer trending group of topics dissimilar to each first topic from the first group of topics.

The result represents those topics not seen by the user since the first display and can be visually indicated by the display engine 106 in a number of ways. In one example, the display engine 106 simply prints the missed topics. FIG. 4 shows an example missed topic display with each missed topic 400 displayed in a separate user interface tab 401.

Figure 5:
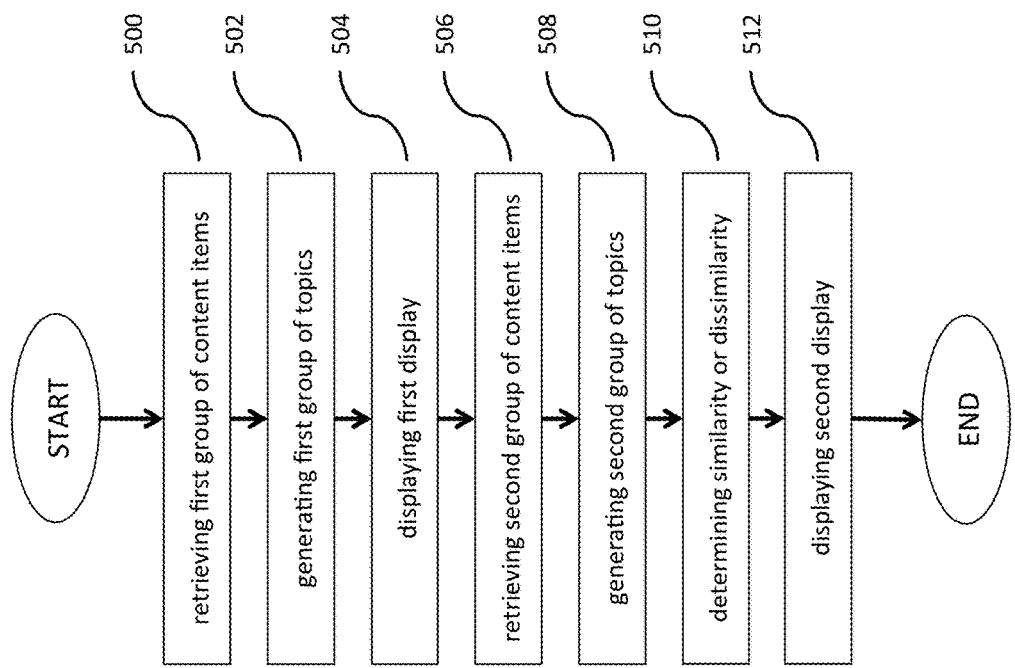
FIG. 5 presents a flow diagram of an exemplary process for generating topics, determining a similarity or dissimilarity between topics, and displaying changes to users in a network environment.

FIG. 5 presents a flow diagram of an exemplary process for generating topics, determining a similarity or dissimilarity between topics, and displaying changes to users in a network environment. At step 500, a first group of content items is retrieved. For example, the content item retriever 100 connects to one or more content sources 110 across the network 107, retrieves content items, and stores them in the content item database 101.

At step 502, a first group of topics is generated for the first group of content items. For example, the topic generator 102 retrieves one or more content items from the content item database 101, generates the first group of topics by associating content items based on subject or theme, and stores the first group of topics in the topic database 103.

At step 504, a first display is shown to a user through a device 108. For example, the display engine 106 retrieves zero or more first topics from the first group of topics from the topic database 103. The display engine 106 then renders the first display that includes the first topics (if any) to the user over a device 108. Further, the display engine 106 stores a user record containing a marker for the user in the user database 105 as described earlier.

At step 506, a second group of content items is retrieved. For example, the content item retriever 100 connects to one or more content sources 110 across the network 107, retrieves content items, and stores them in the content item database 101. Some of these content sources may be the same or different from those content sources in step 500.

At step 508, a second group of topics is generated for the second group of content items and zero or more topics from the first group of content items. For example, the topic generator 102 retrieves content items from the content item database 101, generates the second group of topics by associating content items from the second group of content items and zero or more content items from the first group of content items based on subject or theme, and stores the second group of topics in the topic database 103. The topic generator 102 further ranks and sorts topics from the second group of topics and marks the top-ranking topics, or trending topics, from the second group of topics in the topic database 103. Further, it marks each topic from a no longer trending group of topics accordingly in the topic database 103.

At step 510, a similarity or dissimilarity is determined between at least one topic from the second group of topics and at least one topic from the first group of topics. For example, the topic comparator 104 is given one or more topics from the second group of topics and one or more topics from the first group of topics and computes a topic similarity score as described earlier.

At step 512, a second display is shown to the user in step 504 indicating one or more of the results of determining a similarity or dissimilarity in step 510. For example, the display engine 106 shows a new topic display or a missed topic display as described earlier.

Any part of the method described herein can also function in the system described herein. Furthermore, any part of the method described herein can function in a computer readable medium.

Thus, a system and method for displaying changes in trending topics to a user has been described. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method for displaying changes in trending topics to a user in a network environment, the method comprising:
retrieving a first group of content items;
generating a first trending group of topics for the first group of content items;
retrieving a second group of content items;
after generating the first trending group of topics, generating a second trending group of topics for the second group of content items;
computing a topic similarity score between a second topic from the second trending group of topics and a first topic from the first trending group of topics, the topic similarity score being based on one or more terms contained in one or more content items associated with the second topic and one or more terms contained in one or more content items associated with the first topic;
determining, by the topic similarity score, one or more dissimilarities between the second trending group of topics and the first trending group of topics; and
displaying to the user a display comprising the dissimilarities.

2. The method of claim 1, wherein the computing a topic similarity score is further based on one or more retrieval times of content items associated with the second topic and one or more retrieval times of content items associated with the first topic.

3. The method of claim 1, wherein the computing a topic similarity score is further based on one or more publication times of content items associated with the second topic and one or more publication times of content items associated with the first topic.

4. The method of claim 1, wherein the dissimilarities comprise a dissimilar topic, the dissimilar topic being a member of the second trending group of topics and the dissimilar topic being dissimilar to every member of the first trending group of topics.

5. The method of claim 4, wherein the second trending group of topics comprises a currently trending group of topics.

6. The method of claim 4, wherein the second trending group of topics comprises a no longer trending group of topics.

7. The method of claim 4, wherein the display comprises a visual indicator for the dissimilar topic.

8. A system for displaying changes in trending topics to a user in a network environment, the system comprising:
a processor to execute instructions for:
a content retriever module configured to retrieve a first group of content items and a second group of content items;
a content item database comprising a storage medium for storing the first group of content items and the second group of content items in a database;
a topic generator module configured to generate a first trending group of topics for the first group of content items and thereafter generate a second trending group of topics for the second group of content items;
a topic database comprising a storage medium for storing the first trending group of topics and the second trending group of topics in a database;
a user database comprising a storage medium for storing a marker for the user in a database;
a topic comparator module configured to compute a topic similarity score between a second topic from the second trending group of topics and a first topic from the first trending group of topics, the topic similarity score being based on one or more terms contained in one or more content items associated with the second topic and one or more terms contained in one or more content items associated with the first topic; the topic comparator module further configured to determine, by the topic similarity score, one or more dissimilarities between the second trending group of topics and the first trending group of topics; and
a display engine module configured to display to the user a display comprising the dissimilarities.

9. The system of claim 8, wherein the compute a topic similarity score is further based on one or more retrieval times of content items associated with the second topic and one or more retrieval times of content items associated with the first topic.

10. The system of claim 8, wherein the compute a topic similarity score is further based on one or more publication times of content items associated with the second topic and one or more publication times of content items associated with the first topic.

11. The system of claim 8, wherein the dissimilarities comprise a dissimilar topic, the dissimilar topic being a member of the second trending group of topics and the dissimilar topic being dissimilar to every member of the first trending group of topics.

12. The system of claim 11, wherein the second trending group of topics comprises a currently trending group of topics.

13. The system of claim 11, wherein the second trending group of topics comprises a no longer trending group of topics.

14. The method of claim 11, wherein the display comprises a visual indicator for the dissimilar topic.

15. A non-transitory computer readable medium having embodied thereon a program, the program being executable by a processor for performing a method for displaying changes in trending topics to a user in a network environment, the method comprising:
retrieving a first group of content items;
generating a first trending group of topics for the first group of content items;
retrieving a second group of content items;
after generating the first trending group of topics, generating a second trending group of topics for the second group of content items;
computing a topic similarity score between a second topic from the second trending group of topics and a first topic from the first trending group of topics, the topic similarity score being based on one or more terms contained in one or more content items associated with the second topic and one or more terms contained in one or more content items associated with the first topic;

determining, by the topic similarity score, one or more dissimilarities between the second trending group of topics and the first trending group of topics; and displaying to the user a display comprising the dissimilarities.

* * * * *